(12) United States Patent
Usui et al.

(10) Patent No.: US 6,656,232 B1
(45) Date of Patent: Dec. 2, 2003

(54) ELECTRODE FOR BATTERY, MANUFACTURING METHOD THEREOF, AND APPARATUS FOR IT

(75) Inventors: Hiroyuki Usui, Kanagawa (JP); Tsuneo Ando, Kanagawa (JP); Ikuo Katsumata, Kanagawa (JP); Hiroki Takeshima, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/807,105

(22) PCT Filed: Oct. 7, 1999

(86) PCT No.: PCT/JP99/05529

§ 371 (c)(1),
(2), (4) Date: Jul. 10, 2001

(87) PCT Pub. No.: WO00/21149

PCT Pub. Date: Apr. 13, 2000

(30) Foreign Application Priority Data

Oct. 7, 1998 (JP) .............................................. 10/284914

(51) Int. Cl.⁷ .......................... H01M 6/00; H01M 4/74; H01M 4/72; B23P 13/00
(52) U.S. Cl. .............................. 29/623.1; 29/2; 29/730; 29/731; 429/147; 429/240; 429/239; 141/32
(58) Field of Search ........................ 29/623.1, 2, 623.5, 29/730, 731; 429/94, 147, 146, 132, 134, 135, 239, 240, 241, 242; 141/1.1, 32; 264/104

(56) References Cited

U.S. PATENT DOCUMENTS 5,007,467 A    4/1991   Nelles

FOREIGN PATENT DOCUMENTS

| EP | 0 658 945 | 6/1995 |
|----|-----------|--------|
| FR | 2711 015  | 4/1995 |
| JP | 57-080672 | 5/1982 |
| JP | 62-139251 | 6/1987 |
| JP | 62-243245 | 10/1987 |
| JP | 09-022704 | 1/1997 |
| WO | 99/38221  | 7/1999 |
| WO | WO 99/38221 | * 7/1999 ............ H01M/2/26 |

OTHER PUBLICATIONS

Japanese search report for PCT/JP99/05529 dated Mar. 1, 2000.
English translation of Form PCT/ISA/210.

* cited by examiner

Primary Examiner—Stephen Kalafut
Assistant Examiner—Raymond Alejandro
(74) Attorney, Agent, or Firm—RatnerPrestia

(57) ABSTRACT

An apparatus for manufacturing a battery electrode from foamed metal electrode material includes first and second rollers which are parallel to each other at a shaft center, and rotatable in directions opposite to each other, and a guide bar which is between the first and second rollers. A method for manufacturing a battery electrode includes supplying a foamed metal electrode material including voids, and having a filled portion filled with active material and an unfilled portion without the active material, and a boundary line between the filled and unfilled portions. Part of the unfilled portion is folded in parallel to the boundary line passing through the unfilled portion, and at right angle against the unfilled portion. A lead welding portion is formed along the direction of the longer side, by applying, to the unfilled bent portion, a force in the direction perpendicular to the filled portion in a way to crush the voids, and compress the bent portion. Preferably, the height of the unfilled portion is compressed to a thickness no more than about the thickness of the filled portion. The lead welding portion formed this way has high density and high mechanical strength. And a battery electrode includes a foamed metal including voids and partly filled with an active material and having a plane surface, and a lead welding portion.

21 Claims, 7 Drawing Sheets

ELECTRODE FOR BATTERY, MANUFACTURING METHOD THEREOF, AND APPARATUS FOR IT

This application is a U.S. National Phase application of PCT International application PCT/JP99/05529.

TECHNICAL FIELD

The present invention concerns a method for manufacturing an electrode and an electrode used for batteries, etc. such as nickel hydrogen battery, nickel cadmium battery, etc., and an apparatus for forming an electrode for a battery constructed by spirally winding a porous metallic supporting base filled with active material, and an electrode manufacturing by this processing method.

BACKGROUND ART

The electrode of a secondary battery comprises foamed metal having continuous 3-dimensional network structure highly porous as supporting base and active material filled in this foamed metal. An electrode having such construction demonstrates comparatively excellent discharge characteristics. Moreover, these days, there is a strong request for improvement of high-efficiency discharge characteristics. To achieve that objective, the following construction is proposed: The manufacturing method comprises a process of forming a portion in which the core material portion is exposed without filling active material on one side along the longitudinal direction of the electrode, and a process of forming an about cylindrical electrode group by spirally winding positive and negative electrodes placed one upon another alternately, through a separator, and the end face of said about cylindrical electrode group is constructed only with the core material portion not filled with active material. By this construction, an exposed portion of a metal suitable for welding is formed and, by tabless system, the lead piece is welded to this exposed portion of metal. A secondary battery is proposed for the collecting characteristics of which are improved by such construction.

However, an electrode using foamed metal as core material does not have any solid metallic part in the core portion to which the lead piece can be directly welded. As countermeasures for it are proposed a method of further providing a metal sprayed layer on one side of the electrode on which to weld the lead piece, a method of depositing metal foil in advance for reinforcement, etc., to improve the electric conductivity of the material core portion. Moreover, in the Japanese Patent Laid-Open Publication No. 139251/87 is disclosed a method in which the portion not filled with active material in the electrode core material using foamed metal sheet is compressed in the direction of breadth of the electrode, as a measure for reinforcing the lead piece welding portion of the core material. By this method, the density and strength of the metallic part are increased, enabling welding of the lead piece.

This conventional method is indicated in FIG. 7. The entire surface of the slender and rectangular electrode material 51 is pinched from both the left and the right sides by flat plane, and a strong pressurizing force F1 is applied to that surface by an air cylinder 52. While preventing production of any deformation such as bend, unevenness, change of thickness, etc. on the surface of the electrode and in the state in which one side of the electrode material 51 is supported from below, a strong pressurizing force P is applied by using a press 53, in the direction of breadth of the electrode, from the side of the electrode material not filled with active material. The portion not filled with active material of the foamed metal forming one side in longitudinal direction of the electrode material 51 is compressed, to crush the voids produced with foaming. By this method, the density and strength of the metallic part in one side not filled with active material of the electrode material 51 are increased. In this way, attempts were made for achieving easy welding and improvement of quality.

However, generally, the filling volume of active material is variable depending on the portions of the surface of electrode and, therefore, the thickness of the surface of electrode is uneven. For that reason, it was difficult to uniformly support the surface of the electrode with metallic plane of high hardness from both sides of the electrode material. Moreover, variations were produced also in the filling width of active material in longitudinal direction of the electrode material 51. For that reason, the supporting state of the electrode material changes at the portion in longitudinal direction and, when an attempt is made to apply a uniform pressurizing force in the longitudinal direction of the electrode material with a press, both the state of the electrode material receiving the pressurizing force of the press and the supporting state of the electrode material change. As a result, variations were liable to be produced in the strength and density of the side of electrode serving as lead welding portion, thus making it difficult to manufacture electrodes fully satisfactory from the viewpoint of quality. In the case where priority is given to increasing the strength and density of the lead welding portion of the electrode material by increasing the pressurizing force P of the press applied in the direction of breadth of the electrode material 51, the pressurizing force has influences on the entire breadth of the electrode and the breadth of electrode tends to get narrower on the entire length, and the electrode is deformed under a strong pressurizing force applied locally. It was therefore difficult to form a lead welding portion of high density suitable for welding with a narrow width locally, only on one side of the breadth of electrode over the entire length of the electrode material. Furthermore, it was also difficult to fully retain excellent characteristics of foamed metal in other portions. Still more, this conventional method was insufficient particularly in productivity, and was therefore far from satisfactory.

In the conventional art described above, it was difficult to form any high-density lead welding portion suitable for welding of tabless lead uniformly and with high quality, over the entire length of one side in longitudinal direction of the electrode material, because the filling condition of active material in the electrode material produces variations by delicately changing locally. In addition, when a high-grade plasticity processing is applied to the foamed metal, as described above, the foamed metal is crushed, and the high-density foamed metal portion gets hard and fragile. For that reason, this conventional method also presents a defect that, in a subsequent process, fissures and cracks are produced when forming a cylindrical shape by spirally winding the positive and negative pole plates one upon another through a separator.

The Japan abstract J 57 80672 discloses the manufacturing of an electrode plate for alkaline batteries. A metal fibre substrate of rectangular form having a main area and an end section extending in the lengthwise direction and not being filled with active material. This strip like end section being folded in two or more plies. After this folding step the folded section is compressed to decrease the thickness thereof by applying a force to the folded section.

The object of the present invention is to provide an electrode enabling improvement of both battery performances and productivity in the processes for manufacturing an electrode, a method for manufacturing an electrode and an apparatus for manufacturing an electrode.

These objects are achieved with respect to a method for manufacturing an electrode by the features of claim 1, to an apparatus for forming an electrode by the features of claim 6, and to an electrode for a battery by the features of claim 12, respectively.

Advantageous developments are claimed by the dependent claims.

DISCLOSURE OF THE INVENTION

A manufacturing method of electrode according to the present invention comprises:

(a) a step of filling active material in foamed metal having voids and supplying electrode material having filled portion filled with active material, unfilled portion not filled with the active material, and a boundary line between the filled portion and the unfilled portion, in which the electrode material has a rectangular or band-like shape, the unfilled portion is formed along a longer side of the electrode material, and the boundary line has an about straight line parallel to the longer side, (b) a step of bending part of the unfilled portion, in parallel to the boundary line passing through the unfilled portion, and at right angle against the filled portion, and (c) a step of forming a lead welding portion along the direction of the longer side, by applying, to the unfilled portion bent, a force in the direction perpendicular to the filled portion in a way to crush said voids, and compressing said bent part.

Particularly preferably, in the step (c), the height of said unfilled portion is compressed to a thickness no more than about the thickness of the filled portion.

In the manufacturing apparatus for forming electrode from electrode material bent at right angle according to the present invention, the electrode material is in the shape of a rectangle having filled portion in which active material is filled in foamed metal having voids and unfilled portion not filled with the active material, and the electrode material has the bent portion in which part of the unfilled portion is bent at right angle against the filled portion, in parallel to the longer side of the rectangle passing through the unfilled portion.

The manufacturing apparatus according to the present invention comprises a first roller and a second roller which are installed in parallel with each other at the shaft center and turn in directions opposite to each other, and a guide bar installed between the first roller and the second roller. The distance between the outer circumference of the first roller and the outer circumference of the second roller is equal to the thickness of said filled portion. The filled portion of the electrode material is sent between the outer circumferential face of the first roller and the outer circumferential face of the second roller, the bent portion is sent between the side face of the second roller, and the guide bar and, when passing through the narrowest area between the first roller and the second roller, the bent portion is compressed in the direction perpendicular to the filled portion, the voids in the foamed metal in the bent portion are crushed, and a high-density lead welding portion is formed along the direction of the longer side.

Particularly preferably, the second roller is a stepped roller having a first outer circumferential face, a second outer circumferential face, a third outer circumferential face and a fourth outer circumferential face.

The second outer circumferential face and the third outer circumferential face are positioned between the first outer circumferential face and the fourth outer circumferential face, and the second outer circumferential face is positioned on the first outer circumferential face side.

Of the first outer circumferential face, the second outer circumferential face, the third outer circumferential face and the fourth outer circumferential face, the first outer circumferential face has the largest outside diameter, the second outer circumferential face and the fourth outer circumferential face have one same outside diameter with each other, and the third outer circumferential face has the smallest outside diameter.

The side face of the second roller is formed by the wall face of stepped portion between the first outer circumferential face and the second outer circumferential face.

The guide bar is installed in small clearance with the third outer circumferential face.

The bent portion is sent to be positioned between the side face of said second roller and the guide bar.

The bent portion is compressed by the second outer circumferential face of the second roller and the outer circumferential face of the first roller.

The electrode for battery according to the present invention comprises filled portion having active material filled in foamed metal, and lead welding portion formed by compression of the foamed metal which does not contain the active material. The foamed metal has voids. The lead welding portion is a metallic portion formed with crushing of the voids, by compressing the bent portion formed by bending the unfilled portion not having active material at right angle against the filled portion reducing the height of the folded portion.

Particularly preferably, both the lead welding portion and the filled portion are in the shape of a rectangle, and the lead welding portion has a width narrower than that of the filled portion.

Particularly preferably, the electrode has a shape wound, through a separator, in the direction of the longer side of the rectangle.

Particularly preferably, on a least one face of the surface and the back face of the lead welding portion is formed a plurality of up-down patterns.

This construction makes it possible to obtain, as lead welding portion, a metallic portion having high density and high mechanical strength. In the case where a lead wire is connected to this metallic portion which is a lead welding portion, it becomes possible to perform direct welding of a tabless lead wire to the end face of an electrode, which was difficult with the conventional method. Moreover, by providing a plurality of groove-shaped ups and downs in the lead welding portion, it becomes possible to prevent production of cracks, when placing positive and negative electrode plates one upon another, through a separator, and spirally winding them up to form a cylindrical shape.

As described above, with the construction of the present invention, it becomes possible to obtain a manufacturing method and a manufacturing apparatus of electrode for battery, much simpler and less expensive compared with the conventional manufacturing apparatus, and an electrode.

(a) being a perspective view of the material of electrode for battery is before the processing of the present invention, (b) being a perspective view showing the state in which a bent portion is worked, as preliminary processing, in the portion unfilled with active material of a foamed metal core material which is the material of electrode for battery according to the present invention, and (c) Being a perspective view showing the shape of electrode after the processing of the present invention.

Figure 1A:
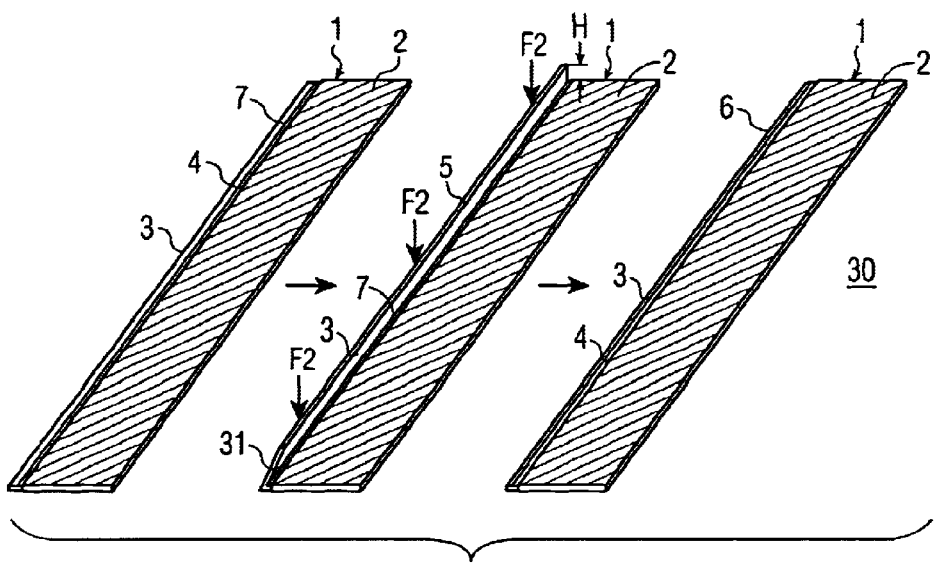
FIG. 1A are perspective views showing the shape of an electrode in the manufacturing process of electrode for battery in an embodiment of the present invention. The view at the far left is a perspective view of the material of electrode for battery before the processing of the present invention. The center view is a perspective view showing the state in which a bent portion is worked, as preliminary processing, in the portion unfilled with active material of a foamed metal core material which is the material of electrode for battery according to the present invention. And the view at the far right is a perspective view showing the shape of electrode after the processing of the present invention.
Figure 1B:
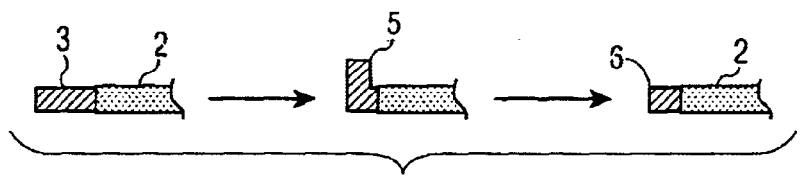

FIG. 1B are sectional views, respectively, of the views of FIG.1A.

Figure 2:
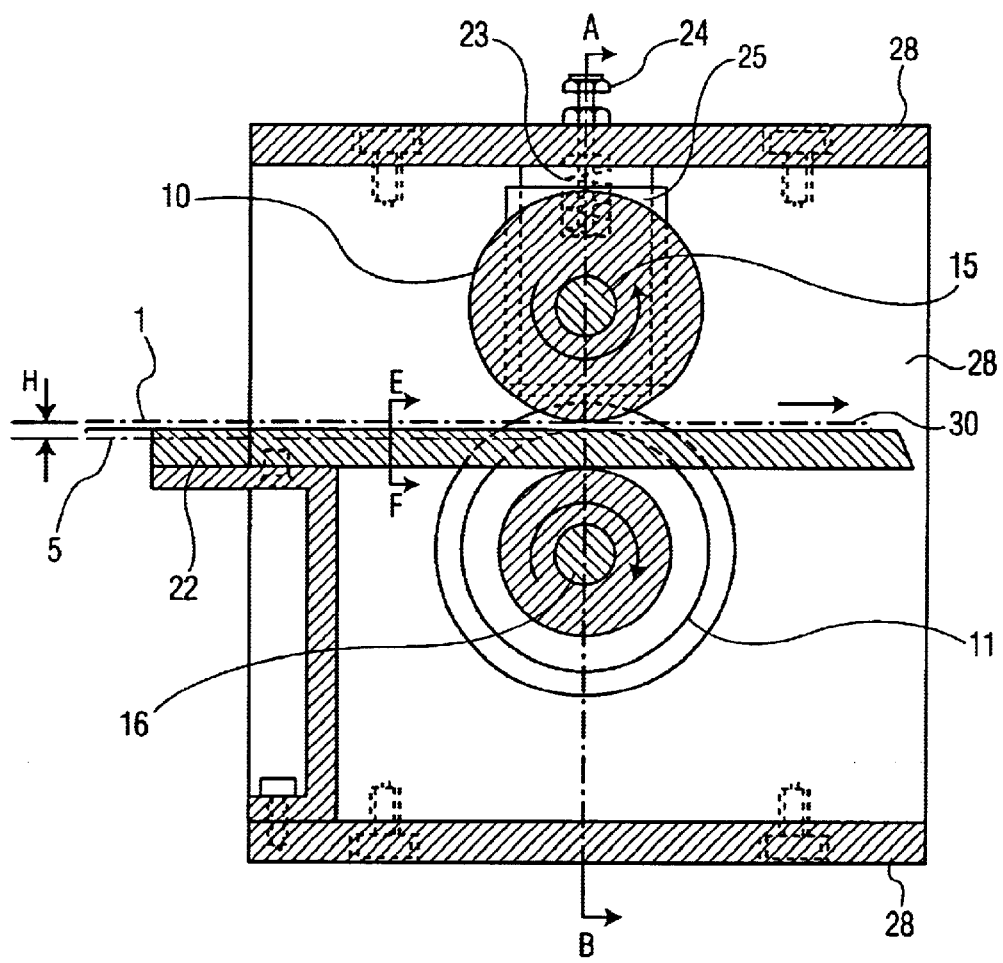

FIG. 2 indicates the front section (C–D section) of the manufacturing apparatus of electrode for battery according to the present invention.

Figure 3:
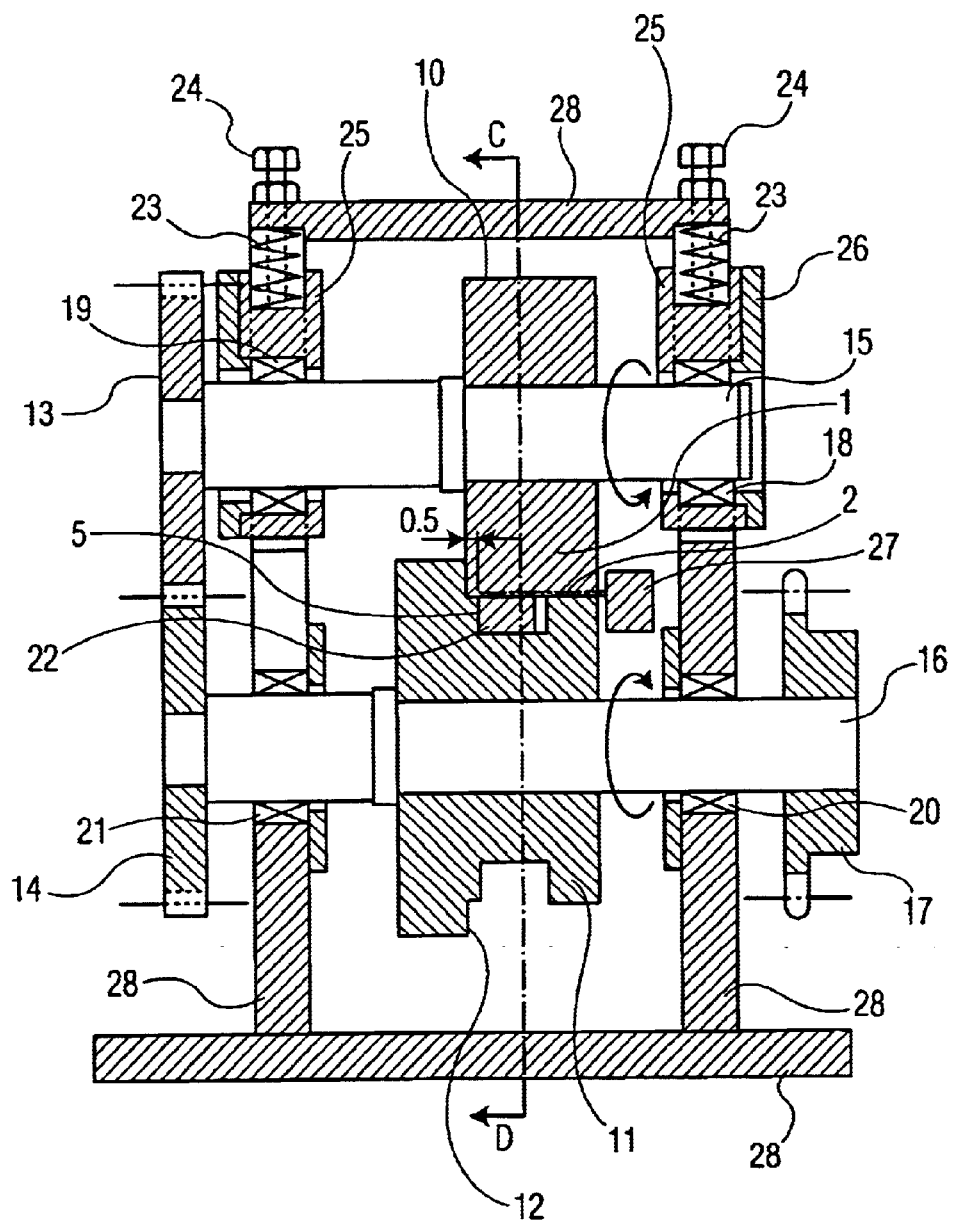

FIG. 3 indicates the side section (A–B section) of the manufacturing apparatus of electrode for battery according to the present invention.

Figure 4:
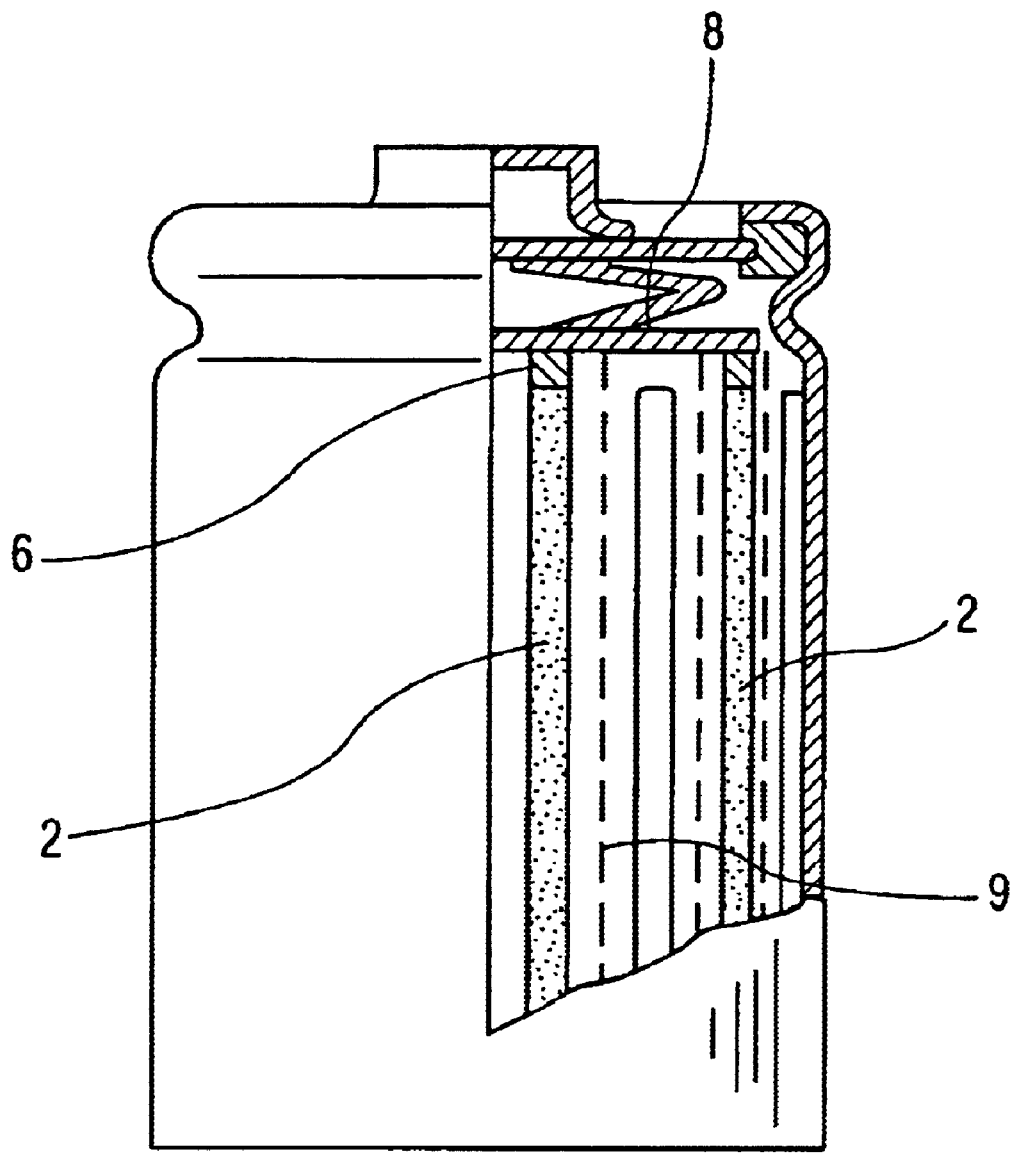

FIG. 4 indicates a partial sectional view showing a battery to which is welded a tabless lead, in the electrode for battery in an embodiment of the present invention.

Figure 5:
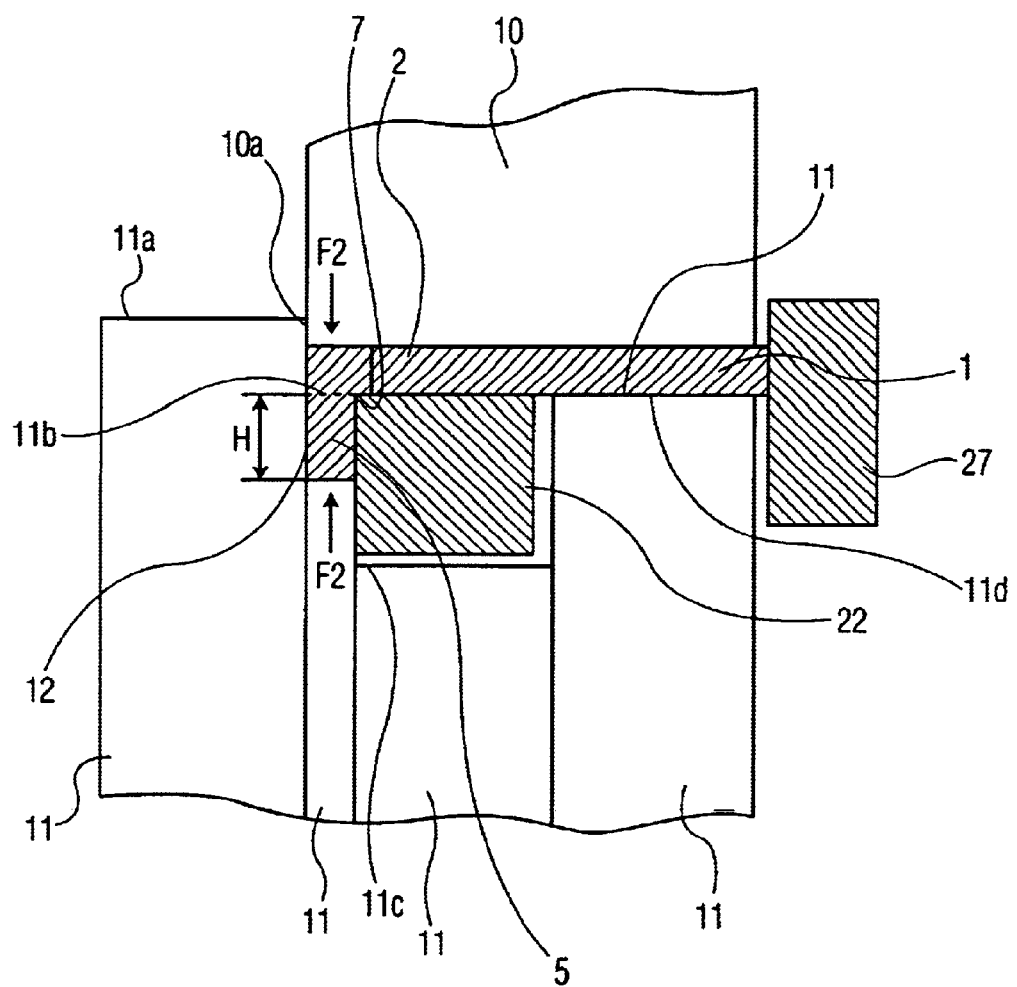

FIG. 5 indicates the E–F sectional view of FIG. 2, an expanded view of a section in main part of the electrode processing apparatus by the method of an embodiment of the present invention.

Figure 6A:
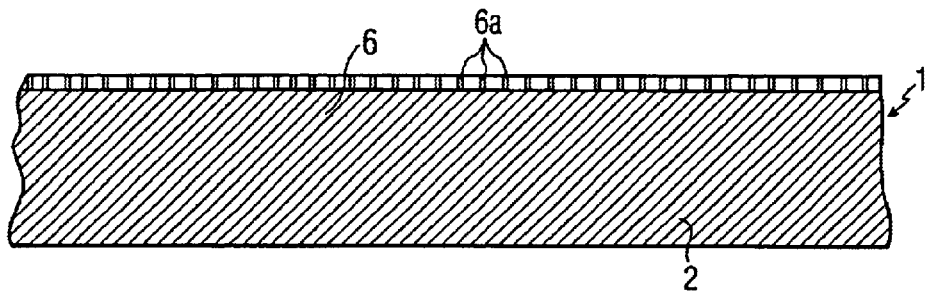
Figure 6B:
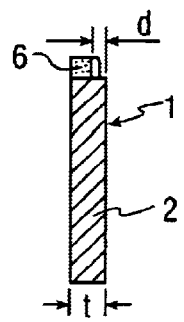
Figure 6C:
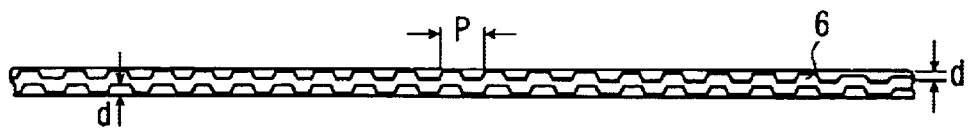

FIG. 6 indicates an electrode plate provided, on both faces of high-density metallic part, with groove-shaped ups and downs in the direction orthogonal to the direction of length of the electrode in an embodiment of the present invention, (A) being a front elevation of the electrode, (B) being a side view of the electrode, and (C) being a plan view of the electrode.

Figure 7:
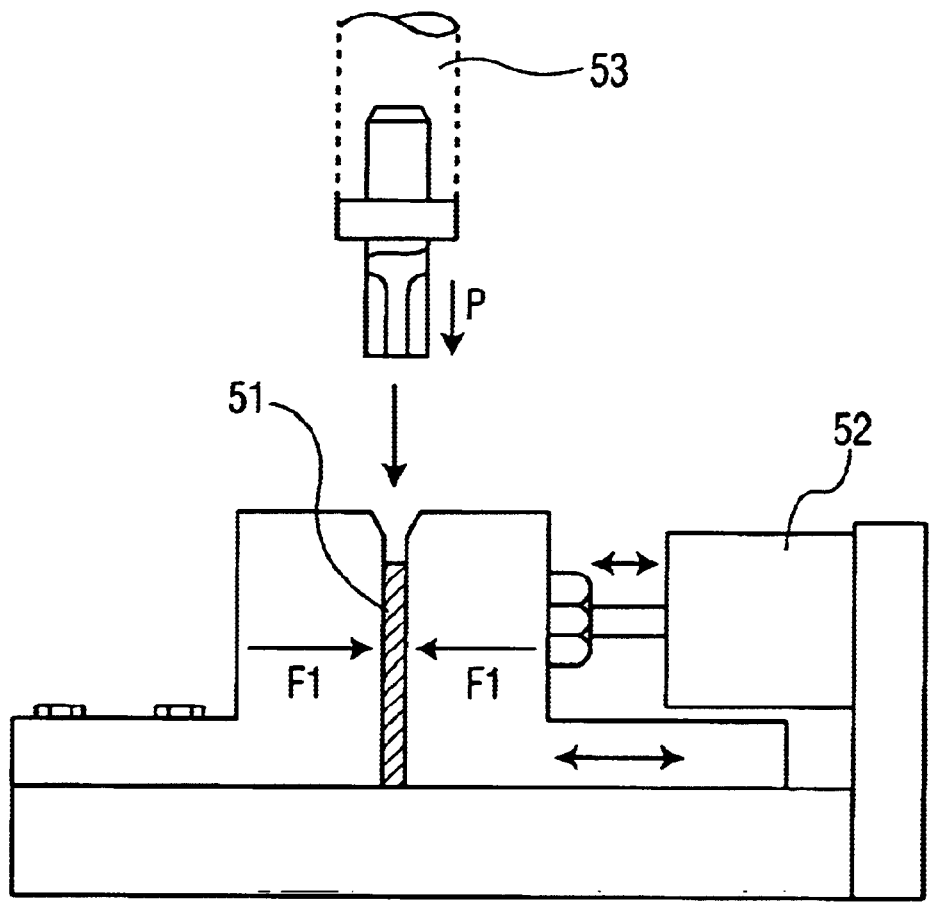

FIG. 7 indicates an explanatory drawing showing the conventional electrode processing method.

BEST MODE FOR CARRYING OUT THE INVENTION

A mode of embodiment of the present invention will be explained hereafter with reference to FIGS. 1A and 1B. The manufacturing processes of an electrode according to the present invention are illustrated in the order of processes beginning at the far left view, then the process at the center view, and then the process at the far right view in FIG. 1A. As shown in the far left view of FIG. 1A, prepare an electrode material 1 of foamed metal filled with active material. The electrode material 1 has a slender rectangular plate. The foamed metal forms the core material of electrode. The electrode material 1 comprises a filled portion 2 filled with active material, an unfilled portion 3 not filled with active material and consisting of foamed metal only, and a boundary line 4 which is the border between the filled portion 2 and the unfilled portion 3. The unfilled portion 3 has a narrow width along the longer side. The filled portion 2 has electrode faces of surface and back face. The foamed metal has a large number of voids in it. Next, as shown in the center view of FIG. 1A, on a straight line 7 parallel to said boundary line, part of the unfilled portion 3 containing unfilled portion 3 is bent at right angle against the electrode face of the filled portion, to form a bent portion 5. After that, in the state in which the bent portion 5 is supported from both sides for protection against buckling, a pressurizing force F2 is forcibly applied to the electrode face of the filled portion 2 from the direction perpendicular to it. By this pressurizing force, the voids in the bent portion 5 are crushed, the bent portion 5 is compressed in the direction of height and is formed in a way to have a thickness no more than about the thickness of the electrode face of the filled portion 2. As a result, as shown in the far right view of FIG. 1A, a high-density metallic portion 6 produced by crushing the voids in the foamed metal is uniformly formed on one side in the longitudinal direction of the electrode material 1. The metallic portion 6 is a lead welding portion for connecting a lead. An electrode 30 is manufactured in this way.

The formation of the bent portion 5 made by bending part of the unfilled portion 3 at right angle against the filled portion, prevents the pressurizing force F2 from having influences on other areas of the electrode member. Namely, the filled portion 2 is protected against deformation, etc. by forming the folded portion 5 and pressurizing that bent portion 5 only.

In the case where the electrode manufacturing method according to the present invention is adopted in a manufacturing process of battery, it can sharply improve both battery quality and productivity at a time. Especially, it is desirable to use an electrode manufacturing apparatus as shown in FIG. 2 and FIG. 3.

FIG. 2 indicates the front sectional view of the manufacturing apparatus of electrode for battery of an embodiment of the present invention. FIG. 3 indicates the side sectional view of the manufacturing apparatus of electrode for battery of an embodiment of the present invention. In the first place, preparation is made of an electrode material having a filled portion 2 containing active material, an unfilled portion 3 not having any active material and a boundary line 4, as shown in the far left view of FIG. 1A. As method and apparatus for making a bent portion 5 by bending part of the unfilled portion 3 of the electrode material 1, known method and apparatus were used, with no particular specification. Explanation on those method and apparatus will be omitted here, because they are believed to be widely known.

In FIG. 2 and FIG. 3, as the electrode material 1 is pinched by a first roller 10 and a second roller 11 and the respective rollers 10, 11 turn in the direction of arrow mark, the electrode material 1 is compressed while being fed to the right. Namely, the first roller 10 and the second roller 11 turn in directions opposite to each other, and the electrode material 1 inserted between those rollers 10, 11 is transferred by the rotational force of those rollers.

An outline of the main part of the manufacturing apparatus of electrode for forming a metallic portion 6 with high mechanical strength and high density on one side in longitudinal direction of the electrode material 1 by compressing the bent portion 5 will be explained hereafter, with reference to FIG. 2 and FIG. 3.

In FIG. 3, the manufacturing apparatus has a frame 28, a first roller 10 and a second roller 11. The first roller 10 and first fear 73 are fixed to a first shaft 15. The second roller 11 and the second gear 14 are fixed to a second shaft 16. The first roller 10 and the first gear 13 are disposed on the upper side, while the second roller 11 and the second gear 14 are disposed on the lower side. The first roller 10 is a pressurizing roller. The second roller 11 is a stepped pressurizing roller. Moreover, the first shaft 15 is rotatably supported by bearings 18, 19. The second shaft 16 is rotatably supported by bearings 20, 21. Furthermore, those shafts 15, 16 are manufactured in a way not to have any play in the direction of thrust.

FIG. 5 indicates an expanded side view of the contact part at outer circumference of the first roller 10 and the second roller 11. As shown in FIG. 5, the outer circumferential face of the second roller 11 has differences of level.

Namely, the outer circumferential face off the second roller 11 has a first outer circumferential face 11a, a second outer cirumferential face 11b, a third outer circumferential face 11c, and a fourth outer circumferential face 11d. Between the first outer circumferential face 11a and the fourth outer circumferential face 11d are positioned the second outer circumferential face 11b and the third outer circumferential face 11c.

The second outer circumferential face 11b is positioned on the first outer circumferential face 11a side. The third outer circumferential face 11c is positioned between the second outer circumferential face 11b and the fourth outer circumferential face 11d, the first outer circumferential face 11a having the largest outside diameter, the second outer circumferential face 11b and the fourth outer circumferential face 11d having one same outside diameter, and the third outer circumferential face 11c having the smallest outside diameter.

At the position where the outer circumferential face of the first roller 10 comes closest to that of the second roller 11, those rollers 10, 11 turn while the first side face 10a of the first roller 10 remains in contact with the second side face 12 of the second roller 11.

A guide bar 22 is provided in a way to be in small clearance with the outer circumference of the third outer circumferential face. The guide bar 22 has a rectangular section shape. A space is formed between the outer circumferential face of the first roller 10 and the fourth outer circumferential face of the second roller 11, and the filled portion 2 of the electrode material 1 can pass through that space. A space formed among the right side face 12 of the second roller, the left side (−) and second outer circumferential face of the second roller (of the guide bar 22) and the outer circumferential face of the first roller 10 allows passing of the bent portion 5 of the electrode material 1. The clearance between the two rollers 10, 11 is controlled with control of the position of the first roller by slide portion 25 for adjusting clearance between rollers. The bearings 18, 19 are held by a bearing presser board 26.

Moreover, the respective numbers of teeth of the first gear and the second gear are formed, so that the circumferential speeds at the outer circumference of the first roller 10 and the outer circumferential face 11b of the second roller become equal.

The diameter of pitch circle of the first gear 13 is set for a dimension about equal to the outside diameter of the first roller 10. The diameter of pitch circle of the second gear 14 is set for a dimension about equal to the outer circumferential face 11b at small diameter portion of the second roller 11. The second roller has three steps of outer diameter, and the portion positioned at the middle diameter and the gear are nearly equal in the pitch circle diameter. Those two gears 13, 14, which bite with each other, are constructed in such a way that said two rollers 10, 11 turn in directions opposite to each other, at one same circumferential speed at their respective outer circumferential faces, while maintaining a narrow gap between them depending on the thickness of the electrode material 1. A guide bar 27 is provided on the side face side at the position between the first roller 10 and the second roller 11.

In such apparatus, an electrode material 1 having a bent portion 5 and a filled portion 2 is guided by the guide bar 22 and the guide bar 27, to be sent between the first roller 10 and second roller 11. Namely, both faces of the bent portion 5 are inserted between the second side face 12 of the second roller 11 and the side face of the guide bar 22. The surface of the filled portion 2 of the electrode material 1 is pinched, by the force of a compression spring 23 and a bolt 24, between the outer circumference of the first roller 10 and the fourth outer circumferential face 11d of the second roller 11 and, in linkage with the rotation of those rollers 10, 11, the folded portion is sent into the working area accurately at a constant speed. The clearance between the outer circumference of the first roller 10 and the fourth outer circumferential face 11d of the second roller 11 is maintained at a clearance about equal to the thickness of the filled portion 2 of the electrode material 1. For that reason, as the electrode material 1 is sent between the first roller 10 and the second roller 11, the clearance between those first roller 10 and second roller 11 gradually gets narrower, and the clearance between the outer circumferential face of the first roller 10 and the second outer circumferential face 11b of the second roller 11 gradually gets narrower. For that reason, the height H of the bent portion 5 is compressed from both top and bottom and, as the voids in the unfilled portion 3 are crushed, is compressed to a thickness no more than about the thickness of the filled portion 2. In this way, the bent portion 5 is compressed, forming a metallic portion 6 with high strength, high density and small electric resistance consisting of a core material of foamed metal, on one side in longitudinal direction of the electrode material (1). This metallic portion 6 is a lead welding portion. In this way, an electrode 30 having a lead welding portion 6 and a filled portion 2 is manufactured from the electrode material 1. The electrode 30 having a lead welding portion 6 and a filled portion 2 manufactured this way is spirally wound into a cylindrical shape through a separator 9, and a lead piece 8 is welded to the lead welding portion 6. In this way, a closed nickel hydrogen battery having a collector as shown in FIG. 4.

A construction is also possible in which at least one face of the outer circumferential face of the first roller 10 and the second outer circumferential face of the second roller 11 has a plurality of up-down patterns. Particularly preferably, such plurality of up-down patterns are either grooves in the shape of pleats, or projections. In the case of this construction, as shown in FIG. 6, those grooves in the shape of pleats, or projections are transferred to the surface of the metallic portion of the electrode material 1, forming groove-shaped concavities or convexities 6a which are orthogonal to the direction of length of the electrode 30. This provides an advantage of reducing the risk of production of cracks in the metallic portion 6, in the process of forming an about cylindrical electrode group of small diameter by spirally winding positive and negative electrodes 30 having such ups-and-downs portion 6a placed one upon another through a separator. Moreover, the width of the electrode material is reduced by a dimension corresponding to the height H of the bent portion 5, compared with the width before processing. For that reason, it provides excellent effects also in miniaturization of the battery.

In the case where, as electrode material 1, a material cut to a length corresponding to a single piece of battery in advance is used, it is desirable to make a deleted portion 31, as shown at the bottom left of FIG. 1(b). By this method, it becomes possible to prevent the bent portion 5 from touching the outer circumferential face 11b of said roller 11 first, when first sending the electrode material between the two rollers 10, 11, thus avoiding obstacle to the feeding of electrode material.

In the case where, as electrode material 1, a long hoop-shaped continuous material is used, only the first process becomes rather inconvenient, but there is no particular need of deleting part of the folded portion.

Furthermore, the left side face of the guide bar 22 having a rectangular section prevents displacement to left and right due to meandering of the electrode material, when feeding the electrode material 1 between the two rollers 10, 11. Still more, the guide bar 22 plays the role of a support for preventing the bent portion 5 from falling in an unfavorable direction together with the end face 12 of the roller 11, when the bent portion 5 of the electrode material 1 is compressed.

In this apparatus, a rotational drive force having prescribed torque and speed necessary for the processing is transmitted from the drive source (not illustrated), through a sprocket 17, the second shaft 16, the second gear 14, the first gear 13, the first shaft 15, etc., to the first roller 10 and the second roller 11. As shape of electrode material 1 in this case, either a long continuous hoop shape or a shape cut short for each piece of battery may be used. As an example of foamed metal used for battery electrode to which this working method can be applied, foamed metal of high-purity nickel is used. However, this is not limitative, and it is also possible to use foamed metal such as aluminum, copper, pure iron, etc. with excellent spreading performance.

Exemplary Embodiment

Next an exemplary embodiment will be explained.

Explanation will be given on a typical embodiment of electrode of nickel-hydrogen battery, with reference to FIGS. 1A and 1B. As shown in the far left view of FIG. 1A, a long foamed metal of nickel with a thickness of 1.3 mm is used as core material of electrode. This long member is filled with active material. After that, it is compressed and worked to a thickness "t" of 0.5 mm. Next, that worked body is cut in a way to have a width of electrode of 28 mm and a width of 24 mm for the portion filled with active material, and is also cut to a length of 300 mm corresponding to the length of electrode for a single piece of battery. The electrode material 1 is prepared in this way. After that, as shown in the center view of FIG. 1A, the electrode material 1 is at right angle along a straight line 7 parallel to the longitudinal direction of the electrode material 1, passing through a position at 3 mm from the end on the side not filled with active material of the electrode material 1, to form a bent portion 5. While the folding process of electrode was explained about a case where it is performed by an apparatus different from that used in the compressing process of the folded portion, this is not limitative, and it is also possible to provide this process in one same apparatus as apparatus constituting a series of processes. After that, on the electrode manufacturing apparatus indicated in FIG. 2 and FIG. 3, with the bent portion 5 looking down, the electrode material 1 is fed among the first roller 10, the second roller 11 and the guide bar 22, from the left side to the right, along the guide bar 22 and the guide bar 27. In that case, part of the bent portion 5 at the tip of the electrode material 1 is removed. Only in the case where the electrode material is fed for the first time, it is necessary to forcibly push in the electrode material between those rollers 10, 11. However, once the filled portion 2 is pinched between the outer circumference of those rollers 10, 11, the electrode material 1 is automatically sent to the right with a rotation in the direction of arrow mark of those rollers 10, 11. As the electrode material advances to the right, the clearance between the roller 10 and the second outer circumferential face 11b of the second roller 11 is reduced. For that reason, the bent portion 5 is compressed from both top and bottom, and processed in such a way that the height H of the bent portion gradually becomes lower. At the time when the electrode material 1 comes out on the right side after passing through the line connecting the centers of the first roller 10 and the second roller 11, the bent portion 5 is completely crushed, and the thickness of the bent portion 5 becomes about equal to the thickness of the filled portion 2.

In this embodiment, the respective outer circumferences of the first roller 10 and the second roller 11 were given the two different functions of compression for compressing the bent portion 5 and feed for feeding electrode material, but this is not limitative, and it is also possible to provide a separate feed mechanism for feeding the electrode material. To prevent the bent portion 5 from falling in the direction perpendicular to the direction of feed of material and also because of the necessity of supporting the bent portion 5 with the side face of the guide bar 22 and the end face 12 of the second roller 11, the space formed by the left side of the guide bar 22 and the end face 12 of the second roller 11 is set for approximately 0.5 mm, to be slightly wider than the thickness of the core material. Moreover, the dimension of this space is closely related to the width of the metallic portion 6. Furthermore, the space between the outer circumference of the first roller 10 and the outer circumference of the second roller 11 must be set carefully to meet the welding conditions of the tabless lead, because this space is closely related to the thickness of the metallic portion 6.

The circumferential speed at the respective outer circumferential faces of those rollers 10, 11 corresponds to the feed speed of the electrode material 1. The circumferential speed at the respective outer circumferential faces of those rollers 10, 11 was set for approximately 20 m/min. In the case where a hoop-like long material is used as electrode material 1, continuous processing is possible, and the compression can be made very efficiently. In this way, by this working method and apparatus, the width of the electrode 30 gets narrower by approximately 3 mm than the width before processing, and a high-density metallic portion 6 of a width of approximately 0.5 mm is formed on one side of the electrode 30, as shown in the far right view of FIG. 1A. This metallic portion 6 has metallic luster. The density of this compressed metallic portion 6 is approximately 3 to 4 times higher than that of the foamed metal before processing.

In addition, collector of tabless lead was welded, by series spot welding, to the end face of the metallic portion 6 of the electrode group utilizing this electrode 30. As a result, a weld strength greater than that of the metallic portion formed by the conventional method was stably obtained. In this way, the method of this embodiment proved to be much superior to the conventional method, in both productivity and quality.

In this embodiment, the electrode 30 having a metallic portion 6 and a filled portion 2 was once worked to the shape of electrode 30 as shown in the far right view of FIG. 1A, and then this electrode 30 was pinched between two rollers forming, on outer circumference, ups and downs in the shape of pleated knurl which is parallel to the shaft center of the rollers, to apply a pressurizing force to it from both sides. By this method, ups and downs are formed, as shown in FIG. 6, on the surface of the metallic portion 6 formed on one side in longitudinal direction of the electrode 30. In this way, the electrode 30 having ups and downs on the surface of the metallic portion 6 comes to have a better flexibility compared with electrodes having a flat surface. Therefore, good protection is provided against production of cracks in the metallic portion at the time of winding of the electrode group. As a result, the quality and the reliability of the battery improve. Especially, production of cracks is well prevented, even in the case where the electrode 30 is wound to a small diameter. In this way, with a progress of miniaturization of batteries, electrode 30 wound to a small diameter can be manufactured easily and stably, without production of cracks. In this way, it has become clear that this embodiment enables miniaturization of battery and improves quality and reliability of the battery. Furthermore, especially the ups and downs formed on the metallic portion 6 shall preferably be constructed in a way to be formed on both faces rather than on a single face. For example, the ups and downs shall preferably be constructed with a pitch "p" in the range from approximately 1 mm to approximately 2 mm (particularly preferably approximately 1.5 mm), and a depth "d" of grooves in the range from approximately 0.1 mm to approximately 0.15 mm. This construction provides particularly remarkable effects. This metallic portion 6 is identical to the lead welding portion 6.

INDUSTRIAL APPLICABILITY

The present invention can provide a manufacturing apparatus of electrode for battery, much simpler in construction and inexpensive compared with conventional manufacturing apparatuses. In can produce, continuously and efficiently, a metallic portion having high mechanical strength, high density and excellent electric conductivity on one side of the electrode for battery using foamed metal as core material. Moreover, it can produce metallic portion having such excellent performances with stable quality. For that reason, the quality of weld of the tabless lead stabilizes. As a result, batteries with excellent quality can be obtained. Furthermore, defect-free batteries can be stably produced. Still more, batteries with excellent quality can be stably produced. Yet more, the manufacturing cost can be remarkably reduced.

What is claimed is:

1. A method for manufacturing an electrode for a battery comprising the steps of:
    a) supplying a foamed metal electrode material including voids, said foamed metal electrode material having a filled portion filled with active material, an unfilled portion not filled with said active material, and a boundary line between said filled portion and said unfilled portion,
    said foamed metal having a plane surface,
    said electrode material having a rectangular shape or a band shape,
    said unfilled portion being formed along a longer side of said electrode material, and
    said boundary line is extending as a substantially straight line parallel to said longer side,
    b) bending a part of said unfilled portion at a right angle to said filled portion in parallel to said boundary line, thereby forming a bent portion having a free edge and
    c) applying a force onto the free edge of said bent portion in a direction to crush said voids and compress a height of said bent portion, thereby forming a lead welding portion along the direction of said longer side.

2. The method for manufacturing the electrode as defined in claim 1, wherein, in said step (c), the height of said unfilled portion is compressed to a thickness no more than about the thickness of said filled portion.

3. The method for manufacturing the electrode as defined in claim 1, wherein the width of said unfilled portion is narrower than that of said filled portion.

4. The method for manufacturing the electrode as defined in claim 1, wherein, in said step (c), a plurality of up-down patterns are formed on the surface of said lead welding portion.

5. The method for manufacturing the electrode as defined in claim 1, further comprising a step of winding said electrode material having said lead welding portion and said filled portion, through a separator, in the direction of said longer side.

6. The method for manufacturing the electrode as defined in claim 1, wherein said step (c) includes a step of applying said force with such a magnitude that said lead welding portion has a dimension is substantially equal to the thickness of the edge portion before bending.

7. The method for manufacturing the electrode as defined in claim 1, wherein said step (c) includes a step of applying said force such that the height of said bent portion is continuously reduced.

8. An electrode for a battery comprising:
    a foamed metal including voids and partly filled with an active material and having a plane surface,
    a lead welding portion formed of foamed metal not including said active material,
    said lead welding portion formed from a bent portion at right-angle to the plane surface, whereby a height of said bent portion had been reduced.

9. The electrode for battery as defined in claim 8, wherein both said lead welding portion and said filled portion are in the shape of a rectangle, and said lead welding portion has a width narrower than that of said filled portion.

10. The electrode for battery as defined in claim 9, wherein said electrode has a shape wound, through a separator, in the direction of the longer side of said rectangle.

11. The electrode for battery as defined in claim 9, wherein a plurality of up-down patterns orthogonal to the longer side of said electrode material are formed on at least one face of a surface and a back face of said lead welding portion.

12. The electrode for battery as defined in claim 1, wherein said electrode has a shape wound in the direction of the longer side of said rectangle.

13. The electrode for battery as defined in claim 8, wherein said lead welding portion has the same width as a thickness of said foamed metal.

14. An electrode for a battery comprising:
    a foamed metal including voids and partly filled with an active material and having a plane surface,
    a lead welding portion comprising an bent portion formed of foam material not filled with active material at right angle to the plane surface, said bent portion being compressed by a force onto a free edge of said bent portion in a direction perpendicular to said plane surface, whereby a height thereof is reduced.

15. An apparatus for forming an electrode for a battery from foamed metal electrode material having a rectangular shape or a band shape,
    said electrode material having a filled portion of an active material having voids and an unfilled portion not filled with said active material, and
    said electrode material having a bent portion formed by a part of said unfilled portion bent at right angle to said filled portion, extending in parallel to the side of said electrode material, and a free edge,
    said apparatus comprising:

a first roller and second roller, installed in parallel with each other at a shaft center and may be turned in directions opposite to each other, a distance between an outer circumference of said first roller and an outer circumference of said second roller being equal to a thickness of said filled portion, and a guide bar installed between said first roller and said second roller, wherein said filled portion of said electrode material is supplied between an outer circumferential face of said first roller and an outer circumferential face of said second roller, said bent portion passes through the narrowest area between the outer circumference of said first roller and the outer circumference of said second roller, said bent portion being compressed from the said free edge of said bent portion to a bent line in the direction perpendicular to said filled portion, said voids in said foamed metal in said bent portion are crushed, thereby forming a lead welding portion along the direction of said longer side.

16. The apparatus as defined in claim 15, wherein said second roller is a stepped roller having a first outer circumferential face, a second outer circumferential face, a third outer circumferential face and a fourth outer circumferential face, the second outer circumferential face and the third outer circumferential face are positioned between said first outer circumferential face and said fourth outer circumferential face, and said second outer circumferential face is positioned on said first outer circumferential face side, of said first outer circumferential face, said second outer circumferential face, said third outer circumferential face and said fourth outer circumferential face, said first outer circumferential face has the largest outside diameter, said second outer circumferential face and said fourth outer circumferential face have one same outside diameter with each other, and said third outer circumferential face has the smallest outside diameter, a side face of said second roller is formed by the wall face of stepped portion between said first outer circumferential face and said second outer circumferential face, said bent portion is sent to be positioned between the side face of said second roller and said guide bar, and said bent portion is compressed by said second outer circumferential face and the outer circumferential face of said first roller.

17. The apparatus as defined in claim 16, wherein said first roller and said second roller turn, while an end part of the side face of said first roller remains in contact with an end part of the side face of said second roller.

18. The apparatus as defined in claim 15, further comprising a first gear acting in linkage with said first roller and a second gear acting in linkage with said second roller, wherein said first gear and said second gear mate with each other, and a circumferential velocity of said first roller and a circumferential velocity of said second roller are controlled at a same speed and in directions opposite to each other.

19. The apparatus as defined in claim 15, wherein the outer circumferential face of at least one of said first roller and said second roller positioned at the point where said bent portion is inserted has a plurality of up-down patterns on the entire circumference, and said plurality of up-down patterns are transferred to the surface of the lead welding portion formed.

20. The apparatus as defined in claim 19, wherein said plurality of up-down patterns are formed at right angle against the direction of longer side of said electrode material.

21. The apparatus as defined in claim 15, wherein said bent portion is passed through between said first roller, and said second roller, said bent portion being continuously compressed, and a height of said bent portion is continuously reduced whilst the width of said bent portion is maintained at the same dimension as the thickness of said edge portion.

* * * * *

UNITED STATES PATENT AND TRADEMARK OFFICE
CERTIFICATE OF CORRECTION

PATENT NO. : 6,656,232 B1
DATED : December 2, 2003
INVENTOR(S) : Hiroyuki Usi et al.

It is certified that error appears in the above-identified patent and that said Letters Patent is hereby corrected as shown below:

Column 12,
Line 40, "1" should read -- 11 --

Signed and Sealed this

Eighteenth Day of May, 2004

JON W. DUDAS
*Acting Director of the United States Patent and Trademark Office*